July 8, 1969  JUNKICHI ITO  3,453,906
REDUCTION GEAR
Filed Oct. 18, 1966

INVENTOR
Junkichi Ito
BY
ATTORNEY 3,453,906
REDUCTION GEAR
Junkichi Ito, 11-5, Yatsugi 2-chome,
Katsushika-ku, Tokyo, Japan
Filed Oct. 18, 1966, Ser. No. 587,613
Int. Cl. F16h 1/28
U.S. Cl. 74—801                    3 Claims

ABSTRACT OF THE DISCLOSURE

Reduction gearing comprising a free floating planet gear engaging a sun gear and two side by side ring gears; one ring gear being fixed in position providing the reactive force and the other ring gear which is rotatable being the output with all the gearing being enclosed in a stationary housing.

---

The present invention relates to a reduction gear, in general, and to a reduction gear utilizing a planet gear, in particular.

Conventional reduction gears usually comprise a plurality of gear wheels which mesh with each other. Accordingly, these conventional devices involve many gear wheels, which inevitably results in an oversized apparatus and high manufacturing cost.

It is one object of the present invention to provide a reduction gear which does not have these defects.

It is another object of the present invention to provide a reduction gear in which the structure is very simple and the operation is extremely secure and positive.

It is still another object of the present invention to provide a reduction gear by which the manufacturing cost of the apparatus is remarkably reduced and the manufacture is easy and mass production possible.

It is yet another object of the present invention to provide a reduction gear comprising a fixed internally toothed gear and a pinion, both having a properly selected number of teeth, the latter secured to a motor shaft, and the internally toothed gear being nonrotatably fixed to the motor casing, the motor casing in turn being secured to an external cylindrical housing. There is also provided, in opposition to the fixed internally toothed gear, a rotating internally toothed gear having a different number of teeth from that of the fixed internally toothed gear within such a range that no obstacle is produced, in effecting engagement with a single planet gear which engages jointly with both internally toothed gears and the pinion.

Figure 1:
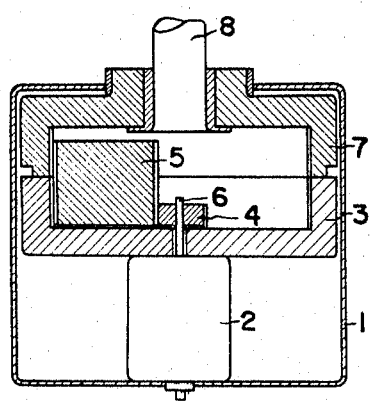
Figure 2:
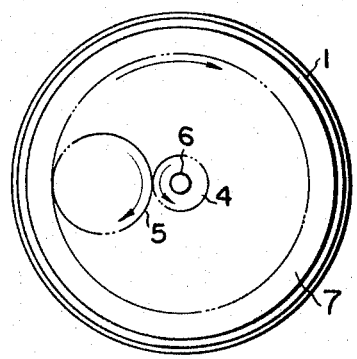

With these and other objects in view, which will become apparent in the following detailed description, the present invention will be clearly understood in connection with the accompanying drawing, in which:

FIGURE 1 is a sectional view of the device in accordance with the present invention, and FIG. 2 is a plan view thereof.

Referring now to the drawing, the reduction gear of the present invention comprises a housing 1 in which a motor 2 is disposed. A fixed internally toothed gear 3, having a central end portion freely mounted by means of a bore on a shaft 6 of the motor, is secured to the casing of the motor 2. A sun gear or pinion 4 is secured to the motor shaft 6, and a rotating internally toothed gear 7 having a different number of teeth from that of the fixed internally toothed gear 3 is arranged in opposed coaxial relationship to the fixed internally toothed gear 3. A planet gear 5 is interposed in engaged relationship between both internally toothed gears 3 and 7 and the pinion 4. A reduction shaft 8 is coupled to the rotating internally toothed gear 7.

If we assume that the number of teeth of the fixed internally toothed gear 3 (the input internally toothed gear) is 40; that the number of teeth of the rotating internally toothed gear 7 (the output internally toothed gear) is 42; and that the number of teeth of the pinion 4 (the sun gear) is 10; then, accordingly, the reduction ratio of the reduction gear according to the present invention is expressed by the following formula:

$$\frac{\text{Number of teeth of the input internally toothed gear} + \text{Number of teeth of the sun gear}}{\text{Number of teeth of the sun gear}}$$

$$\times \frac{\text{Number of teeth of the output internally toothed gear}}{\text{Difference of the number of teeth between the input and output internally toothed gears}}$$

Hence, if a calculation is based on the above assumed numbers of teeth, then the reduction ratio will be:

$$\text{Reduction ratio} = \frac{40+10}{10} \times \frac{42}{2} = 105:1$$

This means that the speed at the output side is reduced to 1/105.

In short, according to the present invention, the fixed and rotating internally toothed gears 3 and 7, respectively, are meshed to the pinion 4 through the planet gear 5 and the reduction is effected according to the difference in teeth number between both internal gears. The reduction ratio may be varied by selection of different teeth numbers. Further, the structure of the present device is extremely simple, and the operation thereof very easy.

Particularly, if the gears are made of synthetic resin, the manufacture thereof may be further simplified and, in addition, noisy sounds, which are otherwise likely to be produced when the gears engage, will be prevented. With these advantages, the present invention provides an extremely practical reduction gear.

I claim:
1. A reduction gear comprising
   a substantially cylindrical housing closed at one end and having an open annular end wall at the other end,
   a motor having a motor shaft and including a motor casing, the latter disposed inside of and secured to said housing at said one end,
   a fixed internally toothed gear coaxially positioned within said housing and tray-shaped including a first cylindrical portion having first internal gear teeth and a first end portion, the latter secured to said motor casing, said first end portion formed with a coaxial bore through which said motor shaft extends in rotating relationship relative thereto,
   a rotatable internally toothed gear rotatably mounted coaxially in said housing and tray-shaped including a second cylindrical portion having second internal gear teeth, the latter substantially aligned cylindrically relative said first internal gear teeth of said fixed internally toothed gear and including a second end wall adjacent said annular end wall of said housing and spaced from said first end will of said fixed internally toothed gear, said internally toothed gears together positioned in opposed relationship defining a substantially cylindrical interior space therebetween,
   an output shaft extending from said housing through said annular end wall and secured to said second end wall of said rotatable internally toothed gear,
   a sun gear disposed in said interior space between said internally toothed gears and secured on the free end of said motor shaft,
   one cylindrical planet gear freely disposed in said interior space between said internally toothed gears and having external gear teeth on its outer periphery engaging jointly with said sun gear and said first and second gear teeth of said internally toothed gears, and said first internal gear teeth having a different number of gear teeth than that of said second internal gear teeth.

2. The reduction gear, as set forth in claim 1, wherein said sun gear and said planet gear substantially abut said first end portion of said fixed internally toothed gear and are spaced apart from said second end portion of said rotatable internally toothed gear.

3. The reduction gear, as set forth in claim 1, wherein said second cylindrical portion of said rotatable internally toothed gear is slidably supported on said first cylindrical portion of said fixed internally toothed gear.

References Cited

UNITED STATES PATENTS

| | | | |
|---|---|---|---|
| 1,772,203 | 8/1930 | Bush | 74—801 |
| 1,799,740 | 4/1931 | Felton | 74—801 |
| 2,053,130 | 9/1936 | Cheyne | 74—801 |
| 2,547,475 | 4/1951 | Larsen | 74—801 |
| 3,081,648 | 3/1963 | Duer | 74—801 |
| 3,164,915 | 1/1965 | Benner et al. | 74—801 |

ARTHUR T. McKEON, *Primary Examiner.*